United States Patent
Itani et al.

(10) Patent No.: US 6,556,157 B1
(45) Date of Patent: Apr. 29, 2003

(54) FREQUENCY DETECT CIRCUIT FOR DETERMINING SAMPLE SPEED MODE OF DECODED AUDIO INPUT DATA STREAMS

(75) Inventors: Nadi Rafik Itani, Austin, TX (US); Jason Rhode, Austin, TX (US)

(73) Assignee: Cirrus Logic, Inc.

( * ) Notice: Subject to any disclaimer, the term of this patent is extended or adjusted under 35 U.S.C. 154(b) by 85 days.

(21) Appl. No.: 09/929,917

(22) Filed: Aug. 15, 2001

(51) Int. Cl.[7] ............................................... H03M 1/00
(52) U.S. Cl. ......................................... 341/123; 341/61
(58) Field of Search .......................... 341/61, 155, 123; 381/58

(56) References Cited

U.S. PATENT DOCUMENTS

| | | | | |
|---|---|---|---|---|
| 5,598,447 A | * | 1/1997 | Usui ........................... | 375/376 |
| 5,661,478 A | * | 8/1997 | Matsushige ................... | 341/61 |
| 5,689,534 A | * | 11/1997 | Anderson et al. ........... | 375/364 |
| 5,942,998 A | * | 8/1999 | Matsuoka ................... | 341/144 |
| 6,285,640 B1 | * | 3/2001 | Hayashi et al. ......... | 369/124.05 |

* cited by examiner

*Primary Examiner*—Peguy JeanPierre
(74) *Attorney, Agent, or Firm*—James J. Murphy, Esq.; Winstead Sechrest & Minick, P.C.

(57) ABSTRACT

Disclosed is a data converter and a method for converting a digital audio stream representing an analog signal that has been sampled at a certain rate. The circuit includes a divider that receives a clock signal associated with the digital audio stream and divides the clock signal by a selectable division factor. The division factor is set according to divider control signals. At the output of the divider is provided an internal clock signal. A frequency detection circuit receives the signal from the output of the divider, and the frequency detection circuit detects the original sampling rate of the audio signal based upon intrinsic characteristics (e.g., MCLK to LRCK ratio) of the digital audio stream. The frequency detection circuit, which may also be used with a separate rate detection circuit to accomplish its function, then generates the divider control signals to the divider to set the division factor in the divider such that the internal clock signal has a known relationship to the original sampling rate based on the sampling mode. A digital processing circuit then receives the internal clock signal from the divider, derives incoming data from the digital audio stream, and generates an output signal.

52 Claims, 8 Drawing Sheets

FREQUENCY DETECT CIRCUIT FOR DETERMINING SAMPLE SPEED MODE OF DECODED AUDIO INPUT DATA STREAMS

TECHNICAL FIELD

The described embodiments lie generally in the field of digital audio coding and decoding. They relate to a system and method for determining the sample speed mode of a PCM input digital audio data stream.

BACKGROUND

Audio support is provided for many modem computer, telephony, and other electronics applications. An important component in many digital audio information processing systems is the PCM decoder. Generally, the decoder receives data in a compressed form and converts that data into Pulse-Code Modulated ("PCM") data. The decompressed digital PCM data is then passed on for further processing, such as filtering, expansion or mixing, conversion into analog form, and eventually into audible tones.

One form of compressed audio data is the S/PDIF format, which can be converted to PCM data with a digital audio receiver chip. The standard PCM data formats contain a high rate clock ("MCLK"), a sample rate clock ("LRCK"), which is used to select between the left and right channel data, a data signal ("SDATA") that contains signal information at the MCLK rate, and a sample signal ("SCLK"), which latches in the data signal. This method allows audio samples with various sample rates and bits per sample to be input to Digital-to-Analog Converters ("DACs") in a serial fashion.

Sampling rates of 48 khz, 96 khz, and 192 khz are common and will be referred to in this specification as single-speed, double-speed, and quad-speed sampling modes, respectively. To convert the PCM data properly, DACs must be set to sample the incoming data at the proper rate. In the prior art, DACs have used programmed bits in a register or have used external pin settings to set their properties according to the speed sampling mode of the incoming PCM or other input format data stream.

SUMMARY

Described herein are embodiments by which the speed-sampling mode can be detected from the incoming PCM digital audio stream. The compressed data stream, such as an S/PDIF data stream, may include overhead information which specifies the speed-sampling mode, but that information could be incorrect. To verify the correctness of information, and in such cases where the overhead information is corrupted or not provided, it is advantageous to be able to determine the speed sampling mode based on the intrinsic PCM clock signals, for example, based on the ratio of the MCLK to LRCK clocks. Further, being able to determine the sample speed mode frees the DAC, ADC, or CODEC from having to receive that information from the digital audio receiver or microcontroller to which it is connected.

The method and system described automatically detects and sets the correct speed-sampling mode based on the intrinsic decoded PCM clock signals. The described method and system can be independent of user input and compressed data format.

Figure 1:
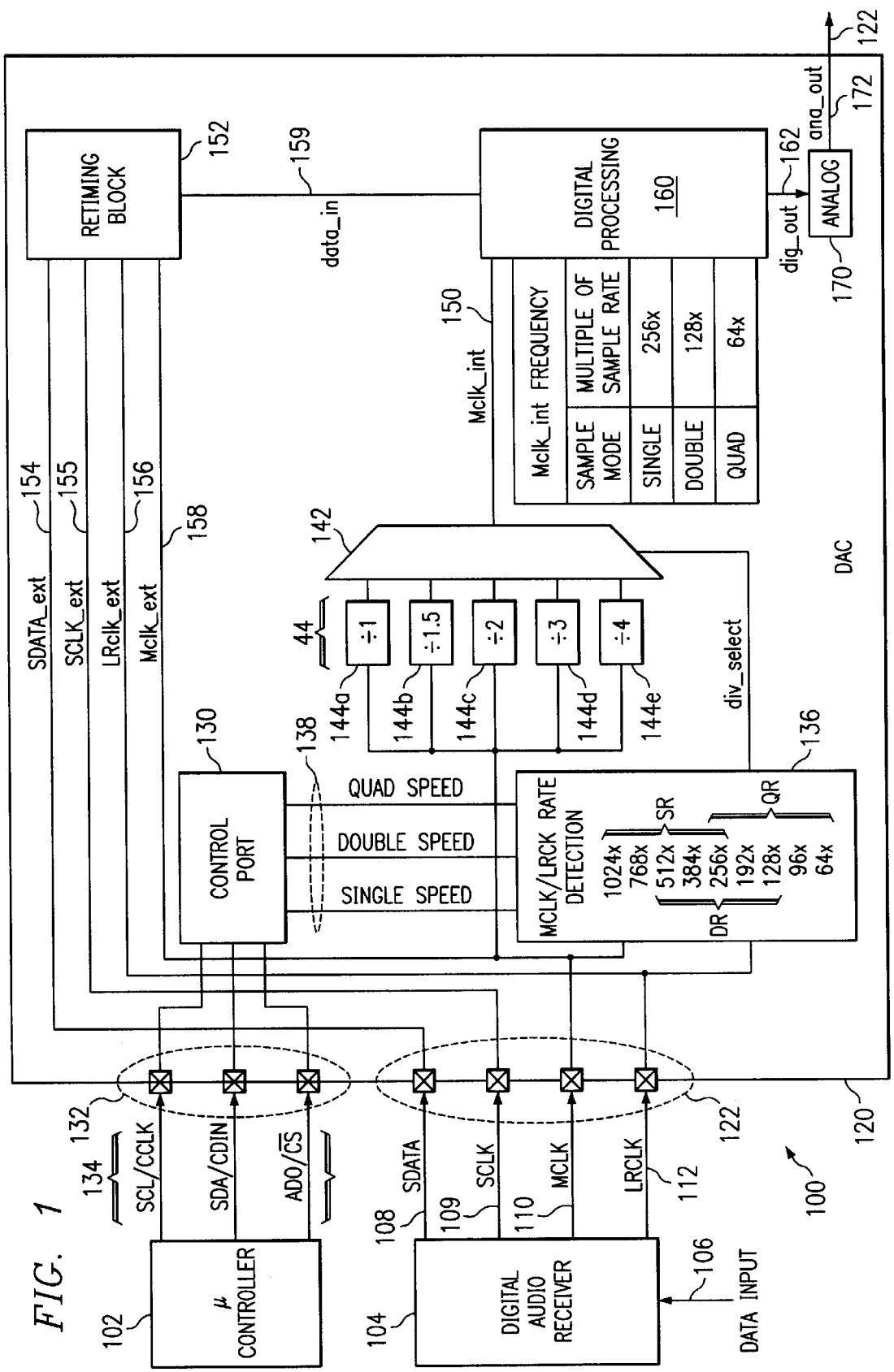
FIG. 1 is a block diagram of an audio digital-to-analog converter system which does not employ a frequency detection circuit for determining the sample speed modes of decoded audio input data streams.

All of these drawings are drawings of certain embodiments. The scope of the claims are not to be limited to the specific embodiments illustrated in the drawing and described below.

DESCRIPTION OF THE PREFERRED EMBODIMENTS

FIG. 1 is a block diagram of an audio decoding and digital-to-analog converter circuit 100 which does not employ a frequency detection circuit for determining sample speed mode of decoded digital audio input data streams. Providing control is a microcontroller 102, which may be an 80C51 or similar microcontroller device. A digital audio receiver 104 is provided for receiving the encoded data input 106, which carries audio data and optionally control information associated with that audio data. The digital audio receiver 104 preferably provides a data output ("SDATA") 108, a signal for latching the data output ("SCLK") 109, and two clock outputs ("MCLK," "LRCLK") 110, 112.

A data converter, which in a specific embodiment may be Digital-to-Analog Converter ("DAC") 120 is preferably connected to the microcontroller 102 and the digital audio receiver 104. The DAC 120 receives the data 108 along with the clock signals 110, 112, and it then operates to convert the decoded digital signal received from the digital audio receiver 104 into an analog output signal 122 provided at the analog output 172 of the DAC 120. The DAC 120 may alternatively be any type of data converter from which it is desirable to extract a sampling rate from an intrinsic digital stream. For example, the DAC or data converter 120 may alternatively be an ADC, CODEC, or other digital encoder or decoder.

To properly convert the received, decoded signal, which is received on the SDATA line 108, the DAC 120 must know the sampling speed mode that was used to encode the original analog signal. This sampling speed mode will be used to convert the decoded digital signal to an analog signal.

Still referring to FIG. 1, to provide the analog signal output 122, the DAC 120 samples the incoming digital audio data stream 108 at a certain rate based on the sample speed mode used. A control port 130 is also provided to interface with the microcontroller 102 through the control port interface 132. This microcontroller interface is necessary in particular if the DAC must be externally set to the proper sampling speed mode. The microcontroller provides control signals 134 to control the DAC 120 through the interface 132. The control lines 134 passing through the control port interface 132 are preferably used, in part, to inform the DAC of the speed sample mode being used for the unencoded data stream 108. In prior approaches such as this one, a user might set the DAC 120 for the correct speed sample mode through a programmed command to the microcontroller 102, or the microcontroller 102 might separately determine the speed mode from overhead bits in the incoming encoded data stream at digital audio receiver input 106.

Thus, in typical DACs not employing frequency detection circuits, a register or hardwired connections could be used to set the DACs into single-speed, double-speed, or quad-speed modes. Once the DAC 120 is configured to a certain speed mode (single, double, or quad), that information is then sent by the control port 130 to a MCLK/LRCK rate detection circuit 136 through lines 138.

The MCLK/LRCK ratio detection circuit 136 receives MCLK and LRCK signals 110, 112, which are supplied to the DAC 120 from a digital audio receiver 104. Once MCLK and LRCK 110, 112 are received, the ratio detection circuit 136 determines the ratio of MCLK to LRCK. That ratio and the speed-mode information is then used to determine the divide setting. Table 1, below, illustrates the details of the choice of divide based on MCLK-to-LRCK ratio and sample speed mode. The divide setting is operated as divide_select lines 140, which feed a divider multiplexer 142 to select one of multiple divided MCLK signals (shown as dividers 144 in FIG. 1).

TABLE 1

| Mclk/LRclk ratio | Single Speed div | err | Double Speed div | err | Quad Speed div | err |
|---|---|---|---|---|---|---|
| 1024x | 4x | 0 | 4x | 1 | 4x | 1 |
| 768x | 3x | 0 | 4x | 1 | 4x | 1 |
| 512x | 2x | 0 | 4x | 0 | 4x | 1 |
| 384x | 1.5x | 0 | 3x | 0 | 4x | 1 |
| 256x | 1x | 0 | 2x | 0 | 4x | 0 |
| 192x | 1x | 1 | 1.5x | 0 | 3x | 0 |
| 128x | 1x | 1 | 1x | 0 | 2x | 0 |
| 96x | 1x | 1 | 1x | 1 | 1.5x | 0 |
| 64x | 1x | 1 | 1x | 1 | 1x | 0 |

The output of the dividers 144, which by example are shown as ÷1 (144a), ÷1.5 (144b), ÷2 (144c), ÷3 (144d), ÷4 (144e), are fed into a multiplexer 142, which selects from among the divider outputs to provide an internal MCLK signal ("MCLK_int") signal 150. The MCLK signal goes to the internal digital processing circuitry 160. In the example shown, despite the varying MCLK frequency, the internal MCLK frequency will be the same for single-speed (48 kHz), double-speed (96 kHz), and quad-speed (192 kHz) sampling. In this example, the MCLK_int 150 frequency will be 12.288 MHz. The internal frequency is fixed for these different sampling rates, because while the MCLK frequency increased by factors of 2 from single- to double- to quad-speed modes, so does the divide setting.

Still referring to FIG. 1, a retiming circuit 152 is provided as the interface to the incoming data SDATA_ext 154 and latch signal SCLK_ext 155. The LRCK and is MCLK signals are provided to the connections of the DAC 120 through signal lines LRCK_ext 156 and MCLK_ext 158, respectively. The retiming circuit 152 receives and formats the incoming signals 154, 155, 156, 158, and provides the signal "data_in" 159 for handling by the digital processing circuit 160, which also receives the MCLK_int signal 150 from the divider 142.

The digital-processing block converts the incoming digital data to a decoded digital data signal, "dig_out" 162. A final analog signal circuit 170 receives the "dig_out" signal 162 and generates an analog signal 172 from that incoming decoded digital data signal. The analog signal circuit 170 is preferably a switched-capacitor DAC and filter circuit.

Figure 2:
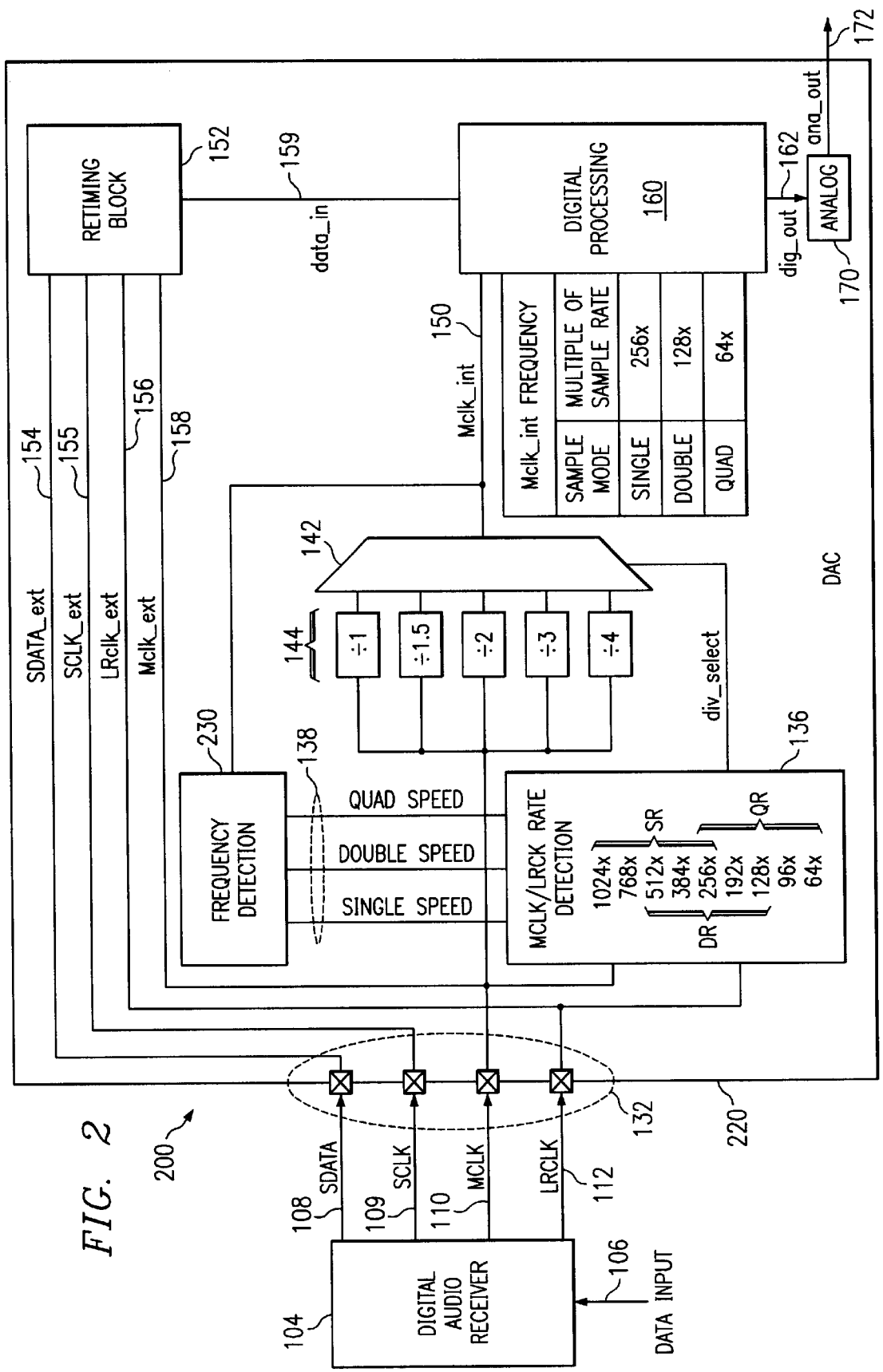
FIG. 2 is a block diagram of an audio digital-to-analog converter system having a frequency detection circuit.

FIG. 2 is a block diagram of an audio decoding circuit 200 having a DAC circuit 200 incorporating a frequency detection circuit 230. This audio decoding circuit 200 operates in a similar fashion to the circuit 100 of FIG. 1, but the frequency detection circuit 230 is used to automatically select the speed mode. This automatic selection of speed mode frees the user from manually setting the speed mode.

The DAC 200 receives an audio stream of SDATA 108, SCLK 109, MCLK 110, and LRCK 112 from the digital audio receiver 104. Depending on intrinsic characteristics of the incoming clock and data stream, such as the frequency of MCLK 110 and the MCLK to LRCK ratio, the frequency detection circuit 230 automatically selects the correct speed mode.

Figure 3:
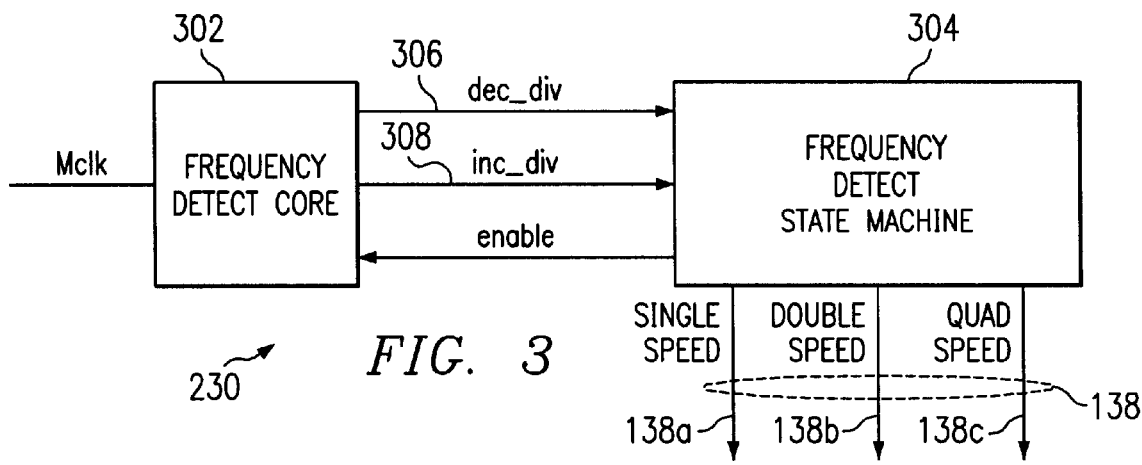
FIG. 3 is a circuit diagram of internal circuitry that can be used for the frequency detection circuit of FIG. 2.

FIG. 3 shows internal circuitry that can be used to implement the frequency detection circuit 230. The frequency detection circuit 230 is preferably comprised of a core frequency detection block 302 and a frequency detection master state machine 304. The job of the core frequency detection circuit 302 is to determine if MCLK_int 150 is at the correct frequency, or if the frequency is too high or low. The circuit 302 outputs a dec_div signal 306 if the frequency of MCLK_int 150 is too low or an inc_div signal 308 if the frequency of the MCLK_int signal 150 is too high. Otherwise, both signals 306, 308 are set low indicating that the correct frequency is detected.

The master state machine 304 runs through a sequence of events and determines what speed mode to set based on the inputs 306, 308 from the frequency detect core 304. Preferably, signal lines 138 comprise 3 lines, one each indicating alternatively that the speed mode is single, double, or quad. Alternatively, these speed modes could be indicated by a pair of lines, $b_1$ & $b_2$, where $b_1b_2=01$ for single-speed mode, $b_1b_2=10$ for double-speed mode, and $b_1b_2=11$ for quad-speed mode. Other protocols for indicating the speed mode by the master state machine 304 are also possible.

Figure 4:
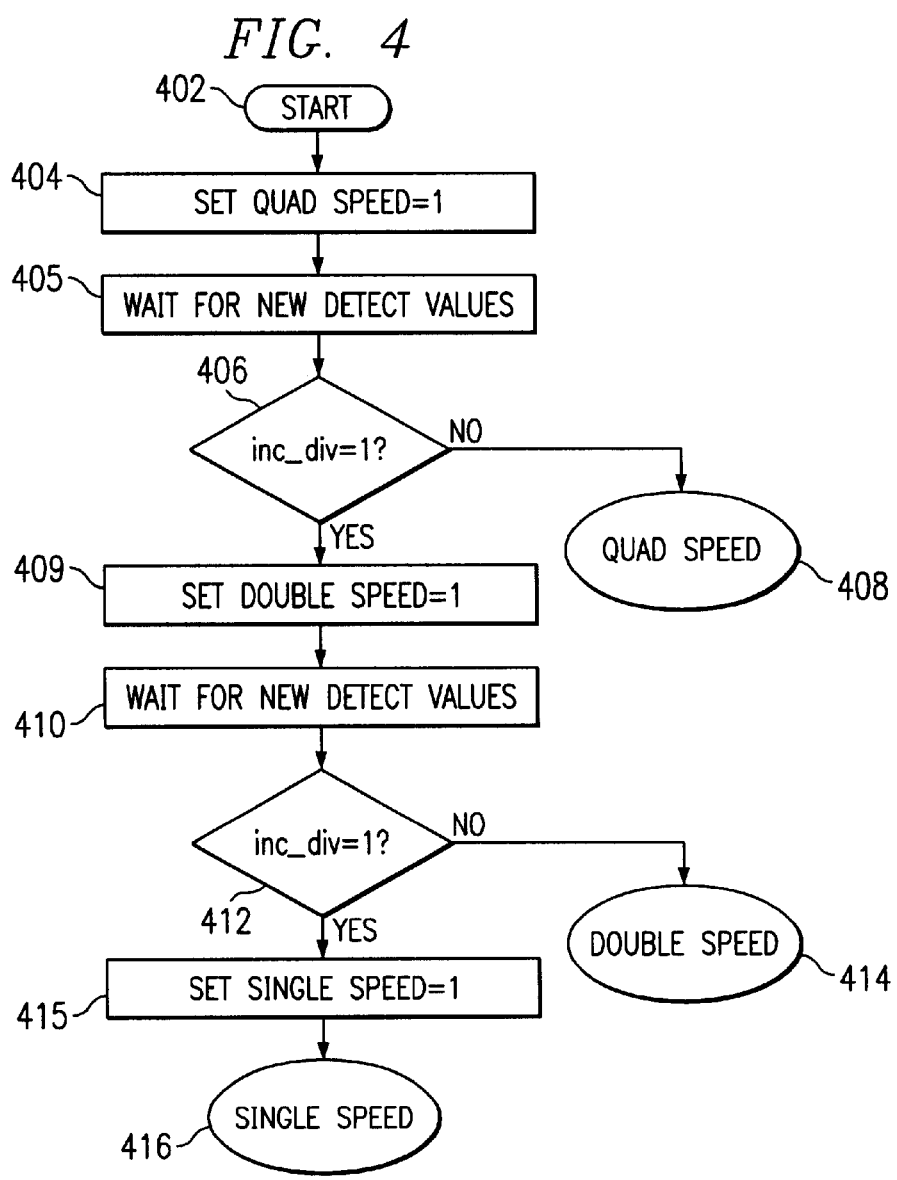
FIG. 4 is a flow chart of one possible implementation of a frequency detection master state machine within the internal circuitry of FIG. 3.

FIG. 4 is a flow chart of one possible implementation of the frequency detection master state machine 304. This method begins at the start block 402 to initiate a sequence of events that will result in the proper determination of the speed mode. The implementation shown here uses a single pass to determine the correct speed mode and only uses the inc_div output 308 of the frequency detection core block 302 (see FIG. 3).

At block 404, the master state machine 304 sets "quad speed" as its initial assumption. The state machine 304 waits for a predetermined period at block 405 to allow (e.g., inc_div 308) to settle. At decision block 406, the master state machine 304 tests the inc_div signal 308 to see if it is asserted (i.e., "1"). If the inc_div signal is not asserted, then the initial assumption of quad-speed mode was the correct one and the state machine goes to block 408, continuing with the DAC 200 in quad-speed mode. If the inc_div is asserted, however, then the initial quad-speed assumption was incorrect. The state machine 304 accordingly proceeds to block 409, whereupon the speed mode is set to double speed. At block 410, the state machine 304 again waits for the detect values to settle. From block 410, the state machine 304 proceeds to decision block 412 to re-test the inc_div signal 308. If the inc_div is not asserted, then the double-speed mode assumption will be the correct one, and the state machine will proceed to block 414, leaving the mode set to double speed. If, however, the inc_div signal 308 is asserted, the state machine 304 sets the speed mode to the only remaining state, which is single-speed mode, at block 416.

Figure 5:
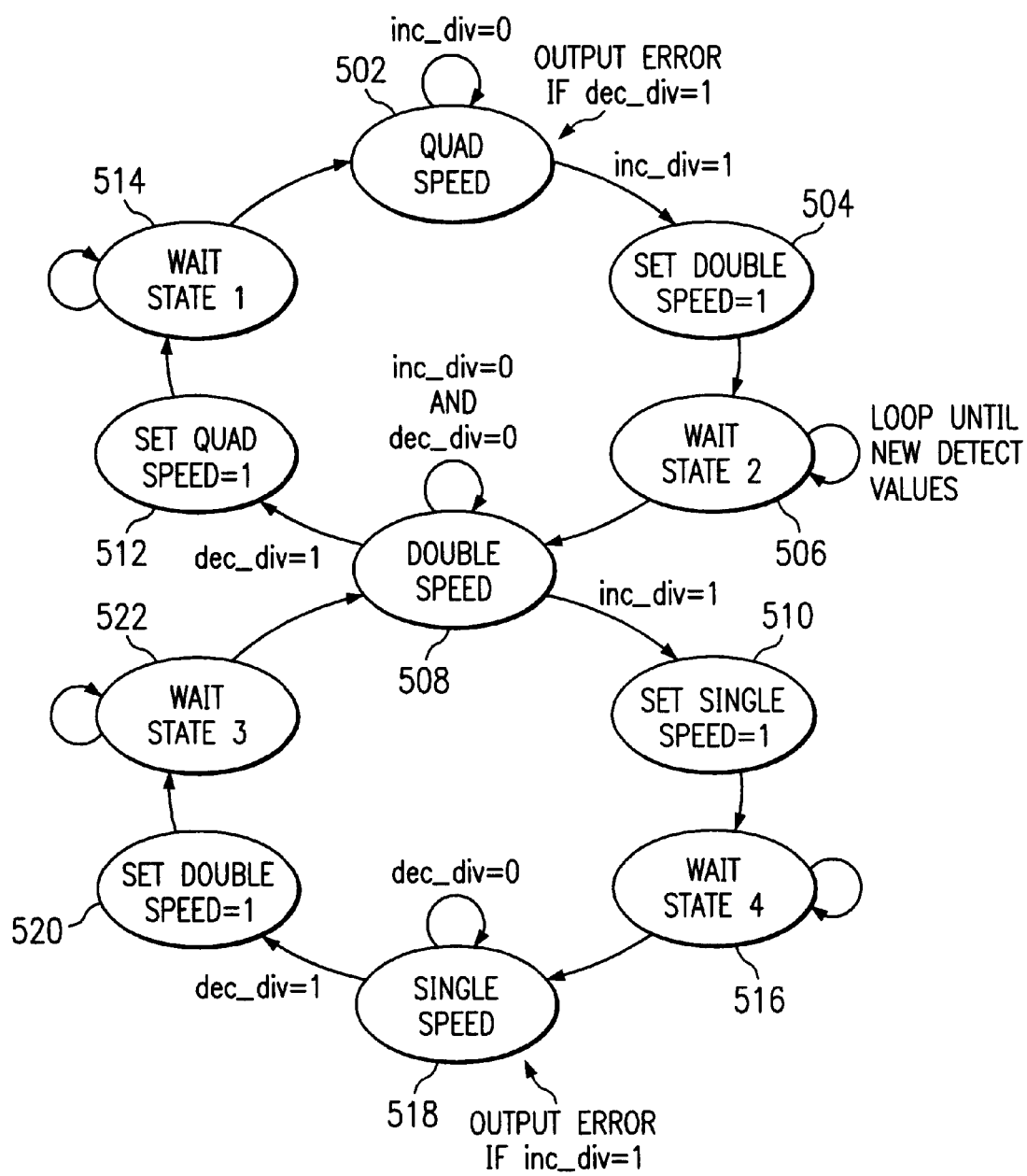
FIG. 5 is a state diagram of another possible implementation of the frequency detection master state machine within the internal circuitry of FIG. 3.

A state diagram of another possible implementation of the master state machine is shown in FIG. 5. This implementation uses inc_div 308 and dec_div 306 signals out of the frequency detect core circuit 302 (see FIG. 3) to provide a continuous speed-mode detection scheme. This method preferably does not use a start signal and is always active. The embodiment described in FIG. 4 has the advantage of being simpler and allows the option of turning off the frequency detect block after done with detect. This embodiment, on the other hand, has the advantage of providing continuous frequency detection so that no start signal is needed and any error will eventually settle out to the correct value.

The state diagram of FIG. 5, as mentioned above, is a continuously operating process. Picking block 502 as the beginning spot for this discussion, the state machine has set the DAC 200 in quad-speed mode, and the state machine stays at block 502 so long as inc_div 308 is not asserted (i.e., "0"). While in this mode, the state machine 304 asserts an output error status if dec_div=1, and moves on to block 504 if inc_div=1 or becomes asserted.

At block 504, the state machine asserts the double speed output 138b from the state machine 304. The operation then proceeds to block 506, which is a wait state. At block 506, the state machine enters into a loop until new detect values are detected, or in other words until the values inc_div and/or dec_div settle.

Once the state machine exits state 506, it proceeds to state 508, which is the static position for double speed operation. The state machine remains at block 508 so long as inc_div and dec_div both equal zero. If inc_div goes high (to "1"), the state machine moves operation to state 510, whereupon it sets the speed mode of the device to single speed. If, on the other hand, the dec_div signal becomes asserted, the operation of the state machine 304 proceeds instead to state 512, where the machine is again set in quad-speed mode operation. From state 512, the state machine 304 enters wait state 514, where it remains until the detect values have an opportunity to settle, whereupon operation of the device returns to quad-speed operation at state 502.

Regarding state 510, which was the state at which the single speed mode was set after operation in the double-speed mode, the machine's operation proceeds to state 516, which is a wait state that continues again until the new detect values settle. From state 516, the device enters static operation in the single-speed mode at state 518. At this state, an error signal is output if inc_div equals one, operation continues so long as dec_div equals zero, and operation proceeds to state 520 if dec_div equals one. At state 520, the device again settles to double-speed mode by the appropriate output from the state machine 304. From this state, the device operation goes to state 522, which is a wait state in which the device remains until the new detect values have settled. From state 522 the device operation returns to the static double-speed state at block 508.

Figure 6:
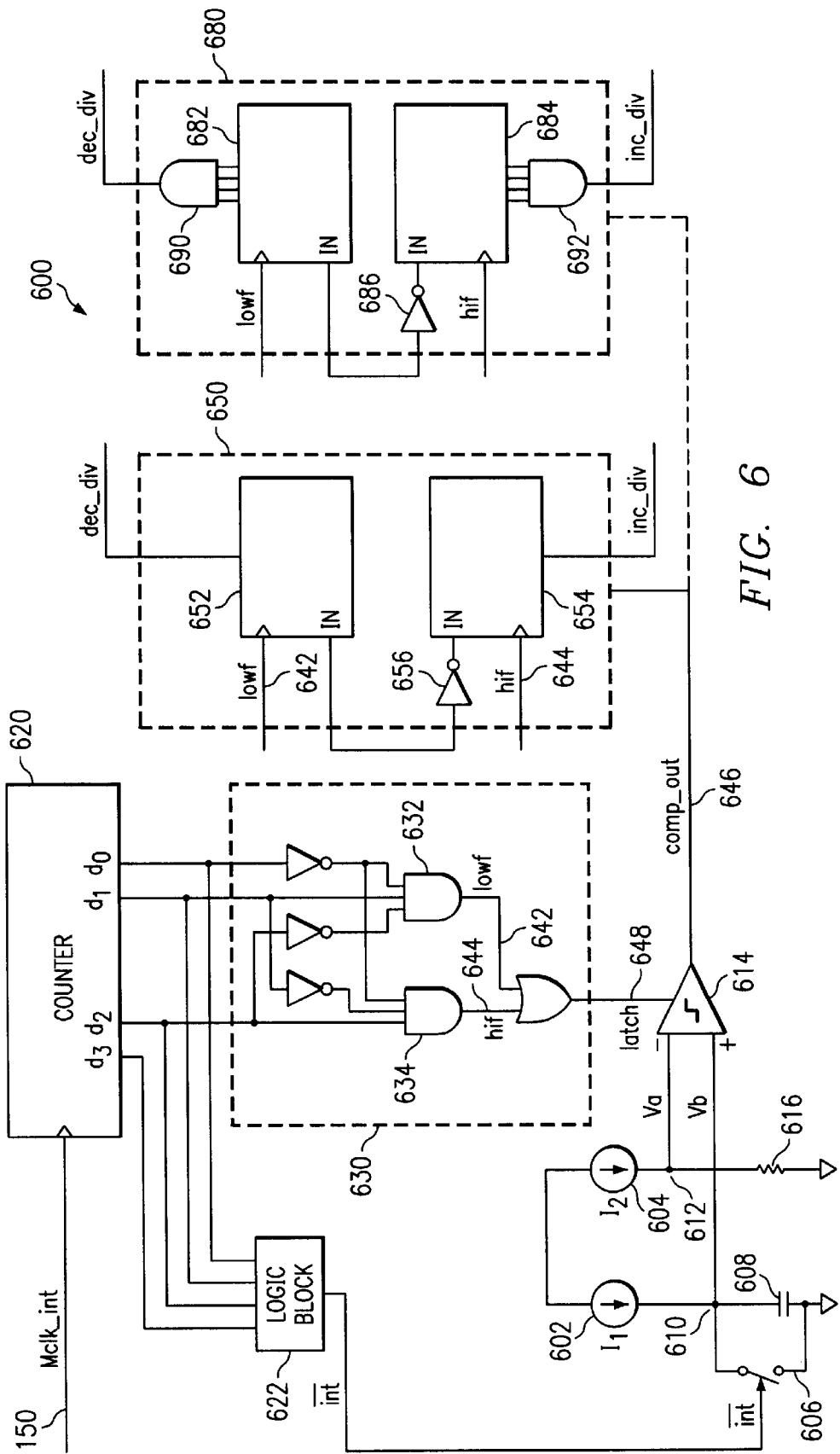
FIG. 6 is a schematic of one implementation of an analog part of the frequency detection core shown in FIG. 3.

FIG. 6 illustrates in schematic form one implementation of the analog part 600 of the frequency detection core 302 (see FIG. 3). This circuit operates to detect whether the received Mclk_int signal 150 is operating at the correct frequency. Circuit 600 contains two current sources $I_1$ 602 and $I_2$ 604. $I_1$ is either directed to ground through a switch 606 when the "integrate" signal int_ 607 is high, or through the capacitor 608 when int_ 607 is low.

The int_signal 607 operates to reset the counter 620 and momentarily short capacitor 608 to ground by closing switch 606, thereby discharging the capacitor 608. The period assertion of the int_signal is provided by the circular counter 620, operating in conjunction with logic block 622. The logic block 622 provides for an unasserted int_ 607 for clock periods zero through five, inclusive (see FIGS. 7–8). The logic block 622 then asserts int_ 607 for periods 6–7, thereby discharging capacitor 608 during that time period by closing switch 606. Once the counter 620 begins its count again at zero, which in this embodiment using a 4-bit counter will be after the seventh cycle, the switch 606 is again opened. The opening of switch 606 allows the current from $I_1$ to again flow into capacitor 608, which forms a linearly-increasing voltage on node 610 ("Vb") that will ramp at the rate $I_1/C$. The current from $I_2$ 604 is passed through resistor 616 to generate a constant voltage on node 612 ("Va")=$I_2$*R.

Still referring to FIG. 6, the comparator 614 compares the ramp voltage Vb on node 610 to the constant voltage Va on node 612 and generates a compare signal, comp_out 646 when the ramp voltage Vb exceeds the constant voltage Va. The signal hif and lowf are generated by the counter 620 along with associated logic gates 630. The specific circuits used are exemplary, and the function described in this embodiment is one of providing a lowf signal 642 at a first fixed number of MCLK_int cycles after the int signal 607 is low-asserted and a hif signal 644 at twice that fixed number of MCLK_int cycles. The OR gate 632 passes both of those pulses through as signal "latch" 648 to the latching comparator 614.

The thresholds set for triggering the hif and lowf signals 610,612 are such that if the frequency of MCLK_int 150 has been correctly set by the frequency detection circuit 230 along with the rate detection circuit 136, the voltage of Vb will cross the voltage on Va after lowf goes high but before hif goes high. This sequence will produce a "low" and then a "high" out of the comparator 614, and the transition occurring between assertion of the hif and lowf signals 610,612 will indicate that the correct frequency of MCLK_int 150 has been detected.

Figure 7:
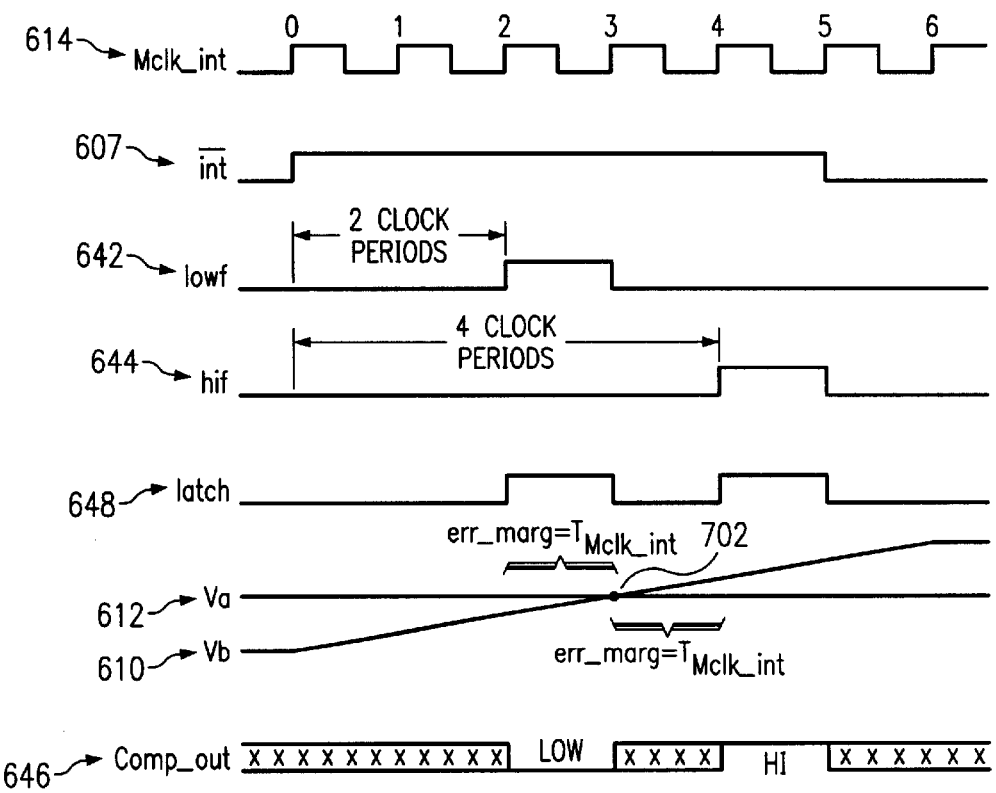
FIG. 7 is a timing diagram showing the signals at relevant nodes of the FIG. 6 circuitry when the internal MCLK signal is set for the correct speed.
Figure 8:
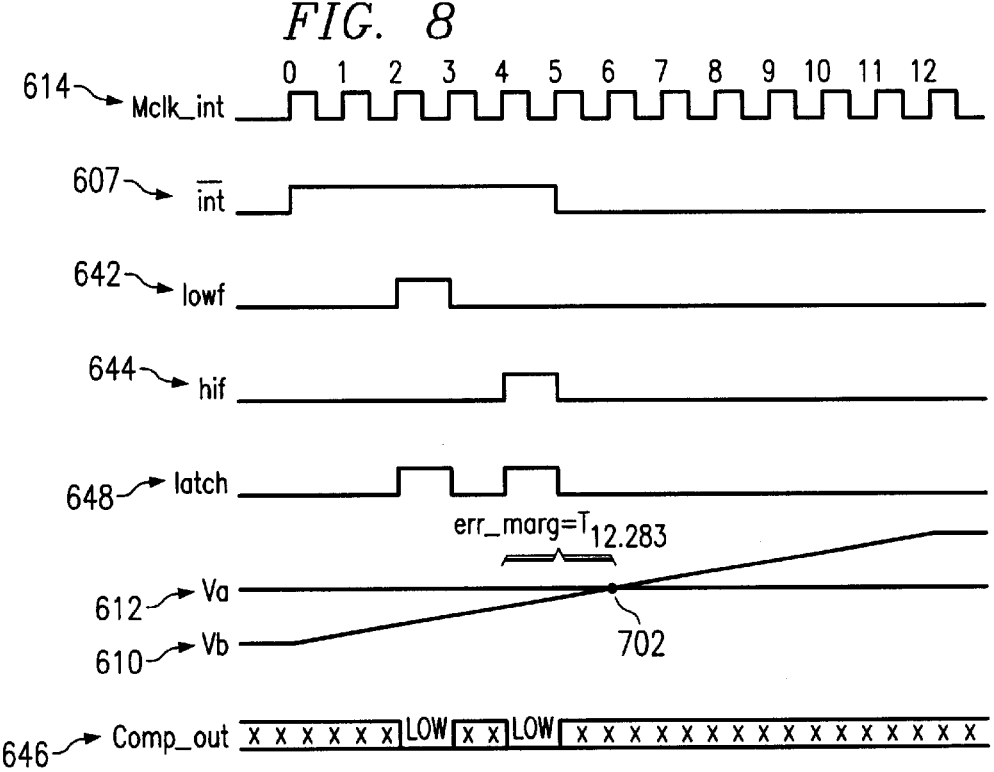
FIG. 8 is a timing diagram showing the signals at relevant nodes of the FIG. 6 circuitry when the internal MCLK signal is set at too high a speed.

If the comp_out signal 646 is low at the hif trigger point, the frequency is too high and the ratio used by divider 142/144 should be increased (see FIG. 8). Accordingly, the inc_div signal 308 is asserted by the frequency detection core 302, and the state machine 304 will then assert the corresponding speed-mode signal 138 such that the rate detection circuit 136 will set the division of the MCLK to the appropriate higher factor division. If the comp_out signal 646 is high at the lowf trigger point, then the frequency is too low and the ratio used by the divider 142/144 should be decreased (see FIG. 7). Accordingly, the dec_div signal 306 is asserted by the frequency detection core 302, and the state machine 304 will assert the corresponding speed-mode signal 138 such that the rate detection circuit will set the division of the MCLK to the appropriate lower factor division.

Still referring to FIG. 6, alternative or complementary latching structures 650, 680 are provided to sense from the comp_out signal 646 whether the Mclk_int signal 150 is at the correct frequency. Latching structure 650 includes a low frequency latch 652, which latches in the state of the comp_out signal 646 at the rising edge of the lowf signal 642. If the comp_out signal 646 is low at the time hif triggers, the Mclk_int signal 150 frequency is too high, as discussed above. In this situation, a "high" voltage, which is the inverted comp_out signal at the time of triggering, will have been latched into 654, and accordingly its "inc_div" output signal 308 will be positively asserted. If, on the other hand, the comp_out signal 646 is high when lowf triggers, the Mclk_int signal 150 frequency is too high, as discussed above. In this situation, the inverter 656 inverts the comp_out signal, such that a "high" voltage is latched into register or latch 654 when hif triggers that input, and accordingly an "inc_div" output signal 308 will be positively asserted. If, in the third situation, the comp_out signal 646 is low when the lowf signal 642 triggers and high when the hif signal 644 triggers, the operating frequency of the Mclk_int signal 150 is correct, and neither the inc_div 308 or dec_div 306 signals will be asserted.

The alternative latching structure 680 operates much as latching structure 650, except that a shift register is provided in effect to latch and shift in the comp_out signals over several cycles of the compare signal, comp_out 646, which begins its period with each assertion of the int_signal 607. In this embodiment, only if the inc_div or dec_div signals described above would have been asserted four consecutive times (using the structure 650 approach) would the inc_div 308 or dec_div 306 signals be positively asserted in this approach. Thus, only if the consistent states of the compare signal, comp_out, would have been asserted or deasserted consistently, would the "averaged" inc_div 308 or dec_div 306 signals have been asserted. This "averaging" is provided by logic circuits, which in this case are multiple-input AND gates 690, 692 which require a consistent high output from each of the outputs of the shift registers 682, 684 before asserting the inc_div 308 or dec_div 306 signals.

Either or both of the alternative latching structures 650, 680 could be used in a system to generate the inc_div 308 and dec_div 306. The circuitry of FIG. 6 can also be calibrated to enable more accurate detection of the sampling rate. As examples, resistor 616 can be implemented as a variable resistor, or a variable resistor or a network of tuning resistors can be placed in parallel with resistor 616. Capacitor 608 can be implemented as a variable capacitor, or a variable capacitor or a network of tuning capacitors can be placed in parallel with capacitor 608. Either or both of the current supplies 602, 604 can be made variable current supplies. By making at least one of these components variable, the threshold voltage or ramp voltage can be adjusted to more accurately determine the sampling rate.

FIG. 7 is a timing diagram showing the signals at relevant nodes of the FIG. 6 circuitry when the Mclk_int signal 150 is set for the correct speed. In this timing diagram, the int_signal 607 resets the counter 620 at the counter's "reset" input (see FIG. 6). The counter then increases in a digital binary pattern, with its bit pattern ($d_2d_1d_0$) increasing with each Mclk_int cycle as follows: 000, 001, 010, 011, 100 . . . . Thus, upon being reset by the int signal 607, the bit pattern goes to "001" at the first rising edge after the reset. This rising edge is marked by a "1" above the Mclk_int signal. At the second rising edge, the bit pattern goes to "010" at the point marked by a "2" above the Mclk_int signal in FIG. 7. The logic gates 630 detect the pattern "010" by the three-input AND gate 632, which then generates the lowf signal 642.

Still referring to FIG. 7, the hif trigger point is provided at the fourth clock cycle of Mclk_int 150. The bit pattern from the counter at the fourth clock cycle will be "100." Three-input AND gate 634 is provided to detect this condition and to generate at its output the hif signal 644. The "latch" signal 648 is simply the OR of both the lowf and hif signals 642, 644. As discussed above, the Vb signal 610 linearly increases with time until it crosses the Va reference signal 612.

The crossover point 702 provides a relatively fixed time frame of reference against which to count the lof and hif cycles. The comparator 614 digitizes this reference point, latching the signal in with the rising edges of lowf and hif. The output of the comparator, "comp_out," 646 is latched in FIG. 7 first at a "low" value when lowf transitions, and is then latched at a "high" value when hif transitions.

The accuracy of the reference crossover point 702 will however, vary according to device parameters and variations in the MCLK frequency from its expected value. The embodiment described can accommodate these variations. With further reference to FIG. 7, the error margin, "err_marg" is shown on either side of the crossover point 702 as the period of the Mclk_int signal 614. The time value of this error margin is shown as "$T_{Mclk\_int}$." This error margin comes into play because, as will be discussed below, the ramp rate of the Vb signal is dependent on the value of the capacitor 608 (see FIG. 6) and the threshold voltage Va is dependent on the value of the resistor 616 (see FIG. 6). Thus, the optimal crossover point 702 can be designed to be exactly at the center between the rising edges of hif and lowf, but component variations can cause the crossover point to shift along the time axis. So long as the crossover point is not off by more than once cycle in the described embodiment as illustrated in FIG. 7, the circuit will still performed as designed to detect incoming Mclk_int frequencies that are either twice the correct frequency or half the correct frequency.

FIG. 8 is a timing diagram showing the signals at relevant nodes of the FIG. 6 circuitry when the Mclk_int signal 150 is set at too high a speed. In this instance, the rising edge of both lowf and hif will happen before Vb=Va and the output of the comparator ("comp_out" 646) will be low at both of those trigger points.

Figure 9:
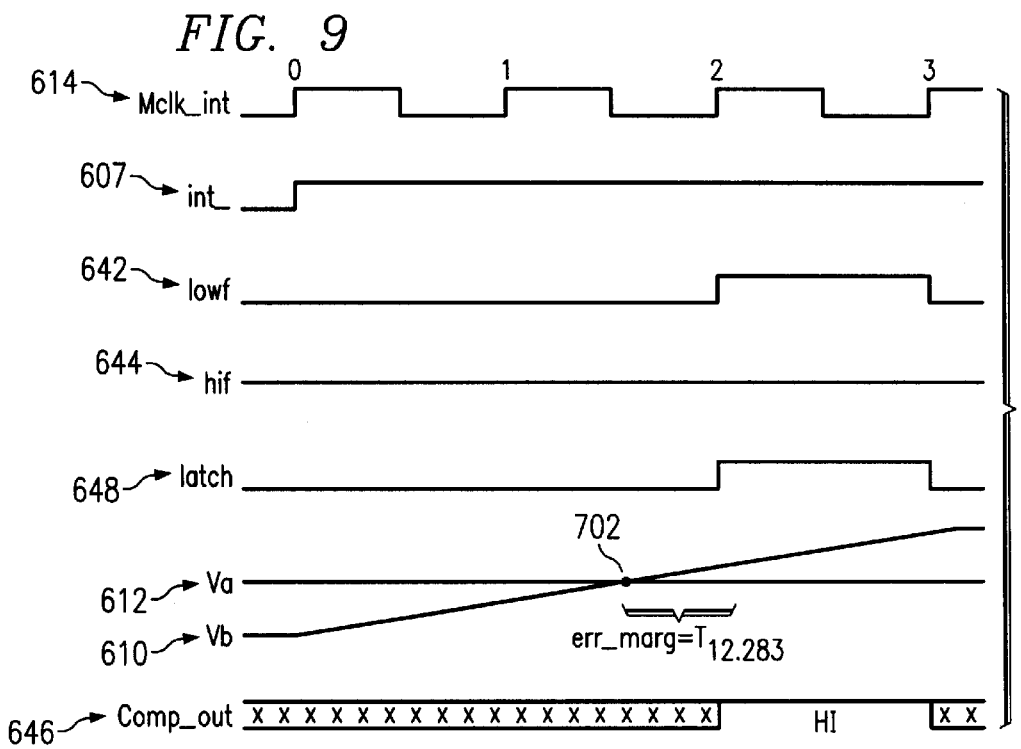
FIG. 9 is a timing diagram showing the signals at relevant nodes of the FIG. 6 circuitry when the internal MCLK signal is set at too low a speed.

FIG. 9 is a timing diagram showing the signals at relevant nodes of the FIG. 6 circuitry when the Mclk_int signal 150 is set at too low a speed. In this situation, Va 612 will cross Vb 610 before the rising edges of both lowf and hif 642, 644.

Figure 10:
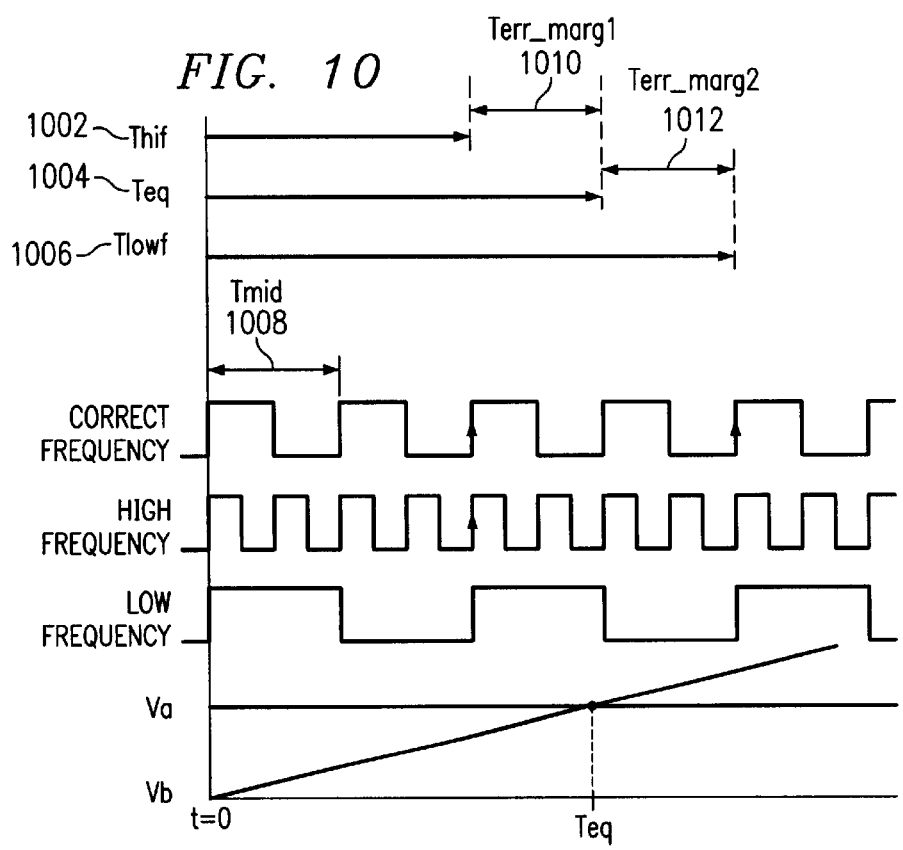
FIG. 10 is a timing diagram showing the effect of variations in frequency detection circuit component values.

FIG. 10 is a timing diagram illustrating the timing design trade-offs and margins of error to non-idealities in timing signals. For discussion purposes, FIGS. 10 assumes a 48 khz sampling rate for single-speed mode, 96 khz for double-speed mode, and 192 khz for quad-speed mode although as will be seen in FIG. 11 this is not always true in real applications. FIG. 10 shows the error margins, and for discussion of these error margins, the following terms are defined:

n=number of MCLK_int cycles from rising of int to rising of lowf latch signal.

$T_{mid}$=the period of MCLK_int when the correct speed mode is selected.

$T_{hif}(1002)$=the time between the rising edge of int and the rising edge of the lowf latch with the correct speed mode selected.

$T_{lowf}$(1006)=the time between the rising edge of int and the rising edge of the hif latch with the correct speed mode selected.

$T_{err\_}=T_{lof}-T_{hif}$ $T_{eq}$(1004)=ideal crossing from rising edge of int to Va=Vb.

let $T_{err\_marge1}$(1010)=$T_{eq}-T_{lof}$ let $T_{err\_marge2}$(1012)=$T_{hif}-T_{eq}$ To get the same error margin on each side of $T_{eq}$ 1004, $T_{eq}$ 1004 is preferably centered between $T_{hif}$ 1002 and $T_{lowf}$ 1006. Thus, $T_{err\_marge1}$(1010)=$T_{err\_marge2}$ $T_{eq}$ (1012)=1.5*n*$T_{mid}$ $T_{hif}$(1002)=2*n*$T_{mid}$ $T_{lowf}$(1006)=1*n*$T_{mid}$ Terr_marg=1*n*$T_{mid}$ $T_{err\_marge1}$ (1010)=0.5*n*$T_{mid}$ Thus, this result for the error margin gives us a $T_{eq}$ 1012 that can have an error band of:

$T_{eq}$(1012)=1.5n*$T_{mid}$*(1 ±⅓) or $T_{eq}=T_{eq}$_nom±33%

$I_1/C*T_{eq}=I_2*R$ $T_{eq}$(1012)=$I_2/I_1*R*C$

If these circuits are implemented in CMOS, the variation of R and C will most likely be the biggest sources of error. If errors are kept below approximately 33%, the circuit will operate to detect single speed, double speed, and quad speed currently. If C and R are independent random variables, standard deviations should add as squared to make up the variation in $T_{eq}$.

Thus, with sampling rates of 48 khz, 96 khz, and 192 khz, the circuit can tolerate capacitance and resistance to have a 3-sigma variation of ±23% and still have a good yield, allowing the circuits to be generally implemented in a standard CMOS process.

Figure 11:
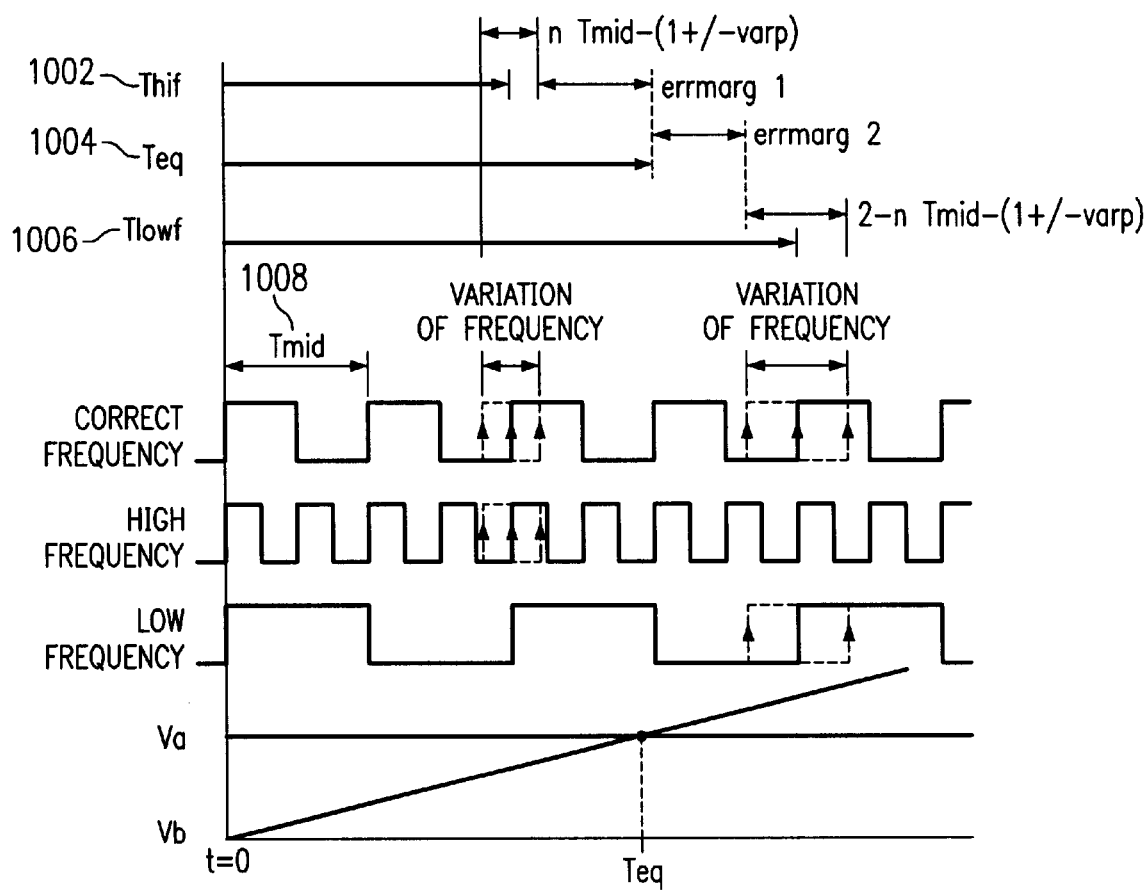
FIG. 11 is a timing diagram showing the effect of small variations in sampling frequency in addition to variations in frequency circuit component values.

Preferably, as shown in the timing diagrams of FIG. 11, the circuit will further provide for frequency variations. DVD audio sampling rates, for example, are shown in Table 2 within each speed mode.

TABLE 2

| Single Speed | Double Speed | Quad Speed | Factor of Max Rate |
|---|---|---|---|
| 32 Khz | 64 Khz | — | 0.667 |
| 44.1 Khz | 88.2 Khz | 176.4 Khz | 0.92 |
| 48 Khz | 96 Khz | 192 Khz | 1.0 |

A preferred frequency detection circuit supports all these various sampling rates. The frequency tolerance, however, would take up some of the allowance for component variation described above.

To account for this frequency variation, new equations with the small frequency variations at each sample speed mode are set forth below.

$T_{mid}$=the average period of MCLK_int when the correct speed mode is selected. This means the middle period of MCLK_int accounting for the max and min sampling rate variation.

varp=the ± percentage variation of the sampling frequency for a given sample speed mode.

| $T_{err\_marge}$ | = $T_{lowf\_min}-T_{hif\_max}$ |
|---|---|
| | = 2*n*$T_{mid}$*(1−varp) − n*$T_{mid}$*(1+varp) |
| | = n*$T_{mid}$(1−3varp) |

Now, let Teq occur in the middle of Thif_max and Tlowf_min so that err_marg1=err_marg2. This way one error margin does not dominate and take away from the other error margin. So:

err_marg1=err_marg2=½*n*$T_{mid}$(1−3*varp)

| $T_{eq}$ | = $T_{hif\_max}$+err_marg1 |
|---|---|
| | = n*$T_{mid}$*(1+varp)+½*n*$T_{mid}$*(1−3*varp) |
| | = 1.5*n*$T_{mid}$−n*$T_{mid}$*varp |

The timing diagram of FIG. 11 shows the small variation in sampling rate and the new error margins generated. From examination of the frequencies set forth in Table 2, the circuit will preferably accommodate a range of 0.667–1.0 in sampling frequency variation. This is equivalent to varp=±20%. This amount of variation yields an err_marg1 (1010)=0.2*n*$T_{mid}$(1008) and a Teq (1004)=1.3*n*$T_{mid}$ (1008). Thus, the system can tolerate a ±15% variation in Teq (1004) and still be able to detect the speed mode correctly. This translates to ±10.6% variation in C and R.

Should the required limits on component value variation be unacceptable for the target process, a calibration approach can be used to achieve the desired component values. Alternatively, the 64 Khz sampling rate in double speed mode is very uncommon and support for this mode could be foregone. In that instance, the error margin then becomes much larger. Not supporting this mode, allows the system to accommodate a variation of only 0.92–1.0 in sampling frequency, or equivalently varp=±4.2%. This reduced variation gives an err_marg1 (1010)=0.437*n*$T_{mid}$ (1008) and a Teq (1004)=1.458*n*$T_{mid}$(1008). From this, it can be found that the system now tolerates a ±30% error in Teq 1004, which is equivalent to a ±21.2% variation in C and R. Current CMOS processes, for example, can generally accommodate this range of component variation. Thus, this system can now be used to detect and set speed modes for the most commonly used frequencies in digital audio. Digital audio stream standards have been developed to include various sampling speed-mode settings (single speed, double speed, quad speed).

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

For example, although AAC decoding is described as the digital audio decoding application above, but the principles described above can be applied to other formats of encoded digital audio data. Different functions described above may be implemented in hardware, software, or firmware. The described processing cores may be general purposes microprocessors or Reduced Instruction Set Computers ("RISC"), the latter of which would specifically include DSPs.

Further, the principles described above can be applied to other data conversion or decoding circuits, or other audio chips, having available incoming clock signals as described above. For example, the above frequency detection and automatic sample rate mode selection can be performed in chips which are in a slave mode where their internal sample rates are determined by external clocks being supplied to those chips. Such data conversion or decoding chips often process data in different ways depending on whether the data had been sampled in single speed, double speed, or quad speed mode, for instance. Traditionally, the user supplied this sampling speed mode information to the chip when switching to a different sampling speed mode. However, with the frequency detection circuit described above, the sampling sample speed mode setting may be determined automatically from the external clocks provided to the chip.

Accordingly, in an analog-to-digital converter ("ADC") embodiment, even though the data is not supplied to the chip in that mode, SCLK, MCLK, and LRCK signals may still be provided to an ADC chip or circuit that is operated in slave mode. In this case, the LRCK signal is used for the sample rate of the ADC. The approach described above can accordingly be used for the ADC in the same manner as described for the DAC.

The approach described above can also be used with a CODEC that is in slave mode. For a CODEC, the data can be supplied to the DACs or sent out from the ADCs, but the incoming clock signals can still be used to determine the sample rate. Digital Receivers that process AES data streams could also be used in combination with the frequency detection circuit to automatically determine the sample rate. In this case, the operation would preferably be a little different because the MCLK signal that is generated by the digital receiver is a fixed rate (e.g., 256*(sample rate)), and thus there would be no MCLK to LRCK rate detect circuit. All the elements above—ADC, DAC, CODEC, and digital receiver—can be referred to generically as "data converters," and any claim referring to a digital converter should be construed to encompass any such circuit which otherwise satisfies the claim elements set forth therein. Further, the recitation of one of these terms in the preamble should be construed as a use environment and not as a limitation upon the claims. In any instance, the specific elements of the embodiments described above can often be replaced by other elements which can perform the described functions. It is therefore, contemplated that the claims will cover such modifications or embodiments.

What is claimed is:

1. A data converter which receives a digital audio stream representing an analog signal that has been sampled at a certain rate, comprising:
   a divider which receives a clock signal associated with the digital audio stream and which divides the clock signal by a selectable division factor according to divider control signals and provides an internal clock signal at its output;
   a frequency detection circuit connected to the output of the divider, the frequency detection circuit operable: to receive the internal clock signal from the divider; to detect the original sampling rate based upon intrinsic characteristics of the digital audio stream; and to generate the divider control signals to the divider to set the division factor in the divider such that the internal clock signal has a known relationship to the original sampling rate; and
   a digital processing circuit which receives the internal clock signal from the divider and incoming data derived from the digital audio stream, and generates an output signal.

2. The data converter of claim 1 and further comprising a rate detection circuit connected to the frequency detection circuit, whereby together the rate detection circuit and frequency detection circuit operate to control the divider to set the division factor such that the internal clock signal has a known relationship to the original sampling rate.

3. The data converter of claim 2 wherein the known relationship of the internal clock signal to the original sampling rate is 256 times the sampling rate for single speed mode.

4. The data converter of claim 2 wherein the known relationship of the internal clock signal to the original sampling rate is 128 times the sampling rate for double speed mode.

5. The data converter of claim 2 wherein the known relationship of the internal clock signal to the original sampling rate is 64 times the sampling rate for quad speed mode.

6. The data converter of claim 2 wherein the rate detection circuit determines the ratio of the frequency of MCLK to LRCK.

7. The data converter of claim 1, wherein the clock signal associated with the digital audio stream received by the divider is received by the data converter at an input.

8. The data converter of claim 1, wherein the clock signal associated with the digital audio stream is derived from the digital audio stream.

9. The data converter of claim 1, and further comprising a calibration circuit associated with the frequency detection circuit, whereby the frequency detection circuit can be calibrated to enable a more accurate detection of the original sampling rate.

10. The data converter of claim 1, wherein the frequency detection circuit further comprises a counter and a fixed time reference circuit, wherein the counter counts clock pulse transitions of the internal clock signal and wherein the fixed time reference circuit is provides a relatively fixed time period for comparison to determine whether a certain number of the clock pulse transitions have occurred within that relatively fixed time period.

11. The data converter of claim 10, wherein the counter and fixed time reference circuits are comprised of integrated CMOS circuits.

12. The data converter of claim 10, wherein the counter triggers a first timing signal at a first count and a second timing signal at a second count that is greater than the first count.

13. The data converter of claim 12, wherein the fixed-time reference circuit generates a compare signal at the relatively fixed time period.

14. The data converter of claim 13, wherein if the first timing signal at the first count has not yet been generated at the time that the compare signal is generated, the frequency of the internal clock signal is too low and the divider is set through the divider control signals to decrease the division of the internal clock signal whereby the frequency of the internal clock signal is increased.

15. The data converter of claim 13, wherein if the second timing signal at the second count has been generated before the compare signal is generated, the frequency of the internal clock signal is too high and the divider is set through the divider control signals to increase the division of the internal clock signal whereby the frequency of the internal clock signal is decreased.

16. The data converter of claim 13, wherein if the first timing signal at the first count has been generated and if the second timing signal at the second count has not been generated at the time the compare signal is generated, the frequency of the internal clock signal is correct and the division of the internal clock signal is not changed, whereby the frequency of the internal clock signal remains the same.

17. The data converter of claim 16 and further comprising a first and a second latch circuit, wherein:

the first latch circuit latches the state of the compare signal at the transition of the first timing signal within at least two repetitions of the relatively fixed time period, whereby for each of the repetitions, if the compare signal is high at the time of the transition of the first timing signal, the first latch stores an indication that the division factor of the divider may need to be decreased; and the second latch circuit latches the state of the compare signal at a transition of the second timing signal within at least two repetitions of the relatively fixed time period, whereby for each of the repetitions, if the compare signal is low at the time of the transition of the second timing signal, the second latch stores an indication that the division factor of the divider may need to be increased.

18. The data converter of claim 17 and further comprising logic circuitry which is connected to the first latch circuit, wherein the logic circuitry is operable to receive the stored states of the compare signals at the transitions of the first timing signal within the at least two repetitions of the relatively fixed time period from the first latch circuit, and wherein the logic circuit is further operable to send a signal to decrease the division factor of the divider if the stored states in the first latch circuit consistently indicate that the division factor of the divider may need to be decreased.

19. The data converter of claim 18 and further comprising logic circuitry which is connected to the second latch circuit, wherein the logic circuitry is operable to receive the stored states of the compare signals at the transitions of the second timing signal within the at least two repetitions of the relatively fixed time period from the second latch circuit, and wherein the logic circuit is further operable to send a signal to increase the division factor of the divider if the stored states in the second shift register consistently indicate that the division factor of the divider may need to be increased.

20. The data converter of claim 13, wherein the relatively fixed time period repeats such that the compare signal repeats periodically and has a period longer than the period of the internal clock signal.

21. The data converter of claim 17 and further comprising a latch circuit which is operable to store over at least two repetitions of the relatively fixed time period, data representing the timing of the first and/or second timing signals relative to the compare signal.

22. The data converter of claim 21 wherein the latch circuit generates at least two outputs comprising the data representing the timing of the first and/or second timing signals relative to the compare signal for the at least two repetitions of the relatively fixed time period, and further comprising a logic circuit which asserts a positive output signal to change the division factor of the divider when at least two of the outputs consistently indicate that the internal clock signal is incorrectly set.

23. A data converter which receives a signal representing an analog signal that has been sampled at a certain rate, comprising:

a divider which receives a clock signal associated with the digital audio stream and which divides the clock signal by a selectable division factor according to divider control signals and provides an internal clock signal at its output;

a frequency detection circuit comprising a counter connected to the output of the divider and a fixed time reference circuit, whereby the frequency detection circuit is operable: to receive the internal clock signal from the divider at the counter; to compare the clock transitions of the signal received from the divider with a fixed-time reference transition signal from the fixed time reference circuit; and to generate the divider control signals to the divider to set the division factor in the divider such that the internal clock signal has a known relationship to the original sampling rate; and a digital processing circuit which receives the internal clock signal from the divider, and incoming data derived from the digital audio stream, and generates an output signal.

24. The data converter of claim 23, wherein the counter and the fixed time reference circuit are comprised of integrated CMOS circuits.

25. The data converter of claim 23 wherein the known relationship of the internal clock signal to the original sampling rate is 256 times the sampling rate for single speed mode.

26. A method of converting a received digital audio stream received at a data converter, the digital audio stream representing an analog signal that has been sampled at a certain rate and generating an analog output signal, the method comprising:

receiving the digital audio stream at an input to the data converter;

receiving at a divider within the data converter, a clock signal associated with the digital audio stream;

dividing the clock signal by a selectable division factor in the divider according to divider control signals;

providing an internal clock signal as an output from the divider;

receiving at a frequency detector circuit, the internal clock signal from the divider;

detecting in the frequency detector circuit, the original sampling rate based upon intrinsic characteristics of the digital audio stream; and generating in the frequency detector circuit, the divider control signals to the divider to set the selectable division factor thereof such that the internal clock signal has a known relationship to the original sampling rate;

receiving in a digital processing circuit, the internal clock signal from the divider, and incoming data derived from the digital audio stream; and generating an output signal from the digital processing circuit using the internal clock signal and the incoming data derived from the digital audio stream.

27. The method of claim 26, wherein the clock signal associated with the digital audio stream received by the divider is received by the data converter at an input.

28. The method of claim 26, wherein the clock signal associated with the digital audio stream is derived from the digital audio stream internally to the data converter.

29. The method of claim 26, wherein the frequency detection circuit further comprises a counter and a fixed time reference circuit, the method further comprising:

counting clock pulse transitions of the internal clock signal in the counter;

providing a compare signal transition after a relatively fixed time period relative to the beginning of a clock cycle of the clock signal associated with the digital data stream; and comparing the number of clock pulse transitions that have occurred during the relatively fixed time period to an expected number of clock pulse transitions.

30. The method of claim 29 and further comprising triggering, at the counter, a first timing signal at a first count and a second timing signal at a second count that is greater than the first count.

31. The method of claim 30 and further comprising generating the compare signal from the fixed-time reference circuit at the end of relatively fixed time period.

32. The method of claim 31 and further comprising controlling the divider through the divider control signals to decrease the division factor if the first timing signal at the first count has not yet been generated at the time that the compare signal is generated.

33. The method of claim 31 and further comprising controlling the divider through the divider control signals to increase the division factor if the second timing signal at the second count has been generated at the time that the compare signal is generated.

34. The method of claim 31, wherein the relatively fixed time period repeats such that the compare signal repeats periodically and has a period longer than the period of the internal clock signal.

35. The method of claim 34 and further comprising storing in a latch circuit over at least two repetitions of the relatively fixed time period, data representing the timing of the first and/or second timing signals relative to the compare signal.

36. The method of claim 35 and further comprising generating at least two outputs from the latch circuit comprising the data representing the timing of the first and/or second timing signals relative to the compare signal for the at least two repetitions.

37. The method of claim 36 and further comprising asserting a positive output signal from a logic circuit to change the division factor of the divider when at least two of the outputs of the latch consistently indicate that the internal clock signal is incorrectly set.

38. A analog-to-digital converter which receives an analog signal and a first and second clock signal:

a divider which receives the first signal and which divides the first clock signal by a selectable division factor according to divider control signals, and which further provides an internal clock signal at its output;

a frequency detection circuit comprising a counter connected to the output of the divider and a fixed time reference circuit, whereby the frequency detection circuit is operable: to receive the internal clock signal from the divider at the counter; to compare the clock transitions of the signal received from the divider with a fixed-time reference transition signal from the fixed time reference circuit; and to generate frequency mode detection signals;

a rate detection circuit connected to the frequency detection circuit and further connected to receive the first and second clock signals, the rate detection circuit operable to generate divider control signals to the divider to set the division factor in the divider such that the internal clock signal has a known relationship to the original sampling rate; and a digital processing circuit which receives the internal clock signal from the divider and the analog signal and generates a digital signal which is derived from the analog signal based on the timing from the internal clock signal.

39. The analog-to-digital converter of claim 38 wherein the rate detection circuit determines the ratio of the frequency of MCLK to LRCK.

40. The analog-to-digital converter of claim 38, wherein the frequency detection circuit further comprises a counter and a fixed time reference circuit, wherein the counter counts clock pulse transitions of the internal clock signal and wherein the fixed time reference circuit provides a relatively fixed time period for comparison to determine whether a certain number of the clock pulse transitions have occurred within that relatively fixed time period.

41. The analog-to-digital converter of claim 40, wherein the counter and fixed time reference circuit are comprised of integrated CMOS circuits.

42. The analog-to-digital converter of claim 40, wherein the counter triggers a first timing signal at a first count and a second timing signal at a second count that is greater than the first count.

43. The analog-to-digital converter of claim 42, wherein the fixed-time reference circuit generates a compare signal at the relatively fixed time period.

44. The analog-to-digital converter of claim 43, wherein if the first timing signal at the first count has not yet been generated at the time that the compare signal is generated, the frequency of the internal clock signal is too low and the divider is set through the divider control signals to decrease the division of the internal clock signal whereby the frequency of the internal clock signal is increased.

45. The analog-to-digital converter of claim 43, wherein if the second timing signal at the second count has been generated before the compare signal is generated, the frequency of the internal clock signal is too high and the divider is set through the divider control signals to increase the division of the internal clock signal whereby the frequency of the internal clock signal is decreased.

46. The analog-to-digital converter of claim 43, wherein if the first timing signal at the first count has been generated and if the second timing signal at the second count has not been generated at the time the compare signal is generated, the frequency of the internal clock signal is correct and the division of the internal clock signal is not changed, whereby the frequency of the internal clock signal remains the same.

47. The analog-to-digital converter of claim 46 and further comprising a first and a second latch circuit, wherein:

the first latch circuit latches the state of the compare signal at the transition of the first timing signal within at least two repetitions of the relatively fixed time period, whereby for each of the repetitions, if the compare signal is high at the time of the transition of the first timing signal, the first latch stores an indication that the division factor of the divider may need to be decreased; and the second latch circuit latches the state of the compare signal at a transition of the second timing signal within at least two repetitions of the relatively fixed time period, whereby for each of the repetitions, if the compare signal is low at the time of the transition of the second timing signal, the second latch stores an indication that the division factor of the divider may need to be increased.

48. The analog-to-digital converter of claim 47 and further comprising logic circuitry which is connected to the first latch circuit, wherein the logic circuitry is operable to receive the stored states of the compare signals at the transitions of the first timing signal within the at least two repetitions of the relatively fixed time period from the first latch circuit, and wherein the logic circuit is further operable to send a signal to decrease the division factor of the divider if the stored states in the first latch circuit consistently indicate that the division factor of the divider may need to be decreased.

49. The analog-to-digital converter of claim 47 and further comprising logic circuitry which is connected to the second latch circuit, wherein the logic circuitry is operable to receive the stored states of the compare signals at the transitions of the second timing signal within the at least two repetitions of the relatively fixed time period from the second latch circuit, and wherein the logic circuit is further operable to send a signal to increase the division factor of the divider if the stored states in the second shift register consistently indicate that the division factor of the divider may need to be increased.

50. The analog-to-digital converter of claim 43, wherein the relatively fixed time period repeats such that the compare signal repeats periodically and has a period longer than the period of the internal clock signal.

51. The analog-to-digital converter of claim 50 and further comprising a latch circuit which is operable to store over at least two repetitions of the relatively fixed time period, data representing the timing of the first and/or second timing signals relative to the compare signal.

52. The analog-to-digital converter of claim 51 wherein the latch circuit generates at least two outputs comprising the data representing the timing of the first and/or second timing signals relative to the compare signal for the at least two repetitions of the relatively fixed time period, and further comprising a logic circuit which asserts a positive output signal to change the division factor of the divider when at least two of the outputs consistently indicate that the internal clock signal is incorrectly set.

* * * * *